United States Patent
Wang

(10) Patent No.: US 6,650,058 B1
(45) Date of Patent: Nov. 18, 2003

(54) VEHICLE HEAD LIGHT OR AUXILIARY LIGHT ASSEMBLY

(76) Inventor: Calvin Wang, 768 S. Turnbull Canyon Rd., City of Industry, CA (US) 91745

( * ) Notice: Subject to any disclaimer, the term of this patent is extended or adjusted under 35 U.S.C. 154(b) by 0 days.

(21) Appl. No.: 10/280,578

(22) Filed: Oct. 28, 2002

(51) Int. Cl.[7] .................................................. B60Q 1/02
(52) U.S. Cl. .......................... 315/82; 315/83; 315/325; 362/507; 362/519; 362/538
(58) Field of Search .............................. 315/77, 82, 83, 315/324, 325; 362/227, 290, 291, 299, 308, 310, 346, 507, 516, 517, 519, 538

(56) References Cited

U.S. PATENT DOCUMENTS

| | | | | |
|---|---|---|---|---|
| 3,855,462 A | * | 12/1974 | Kondo | 362/36 |
| 4,794,494 A | * | 12/1988 | Reeder | 362/512 |
| 4,953,063 A | * | 8/1990 | Nino | 362/539 |
| 4,974,125 A | * | 11/1990 | McGehee | 362/505 |
| 5,446,631 A | * | 8/1995 | Chikada | 362/463 |
| 6,527,426 B2 | * | 3/2003 | Oyama et al. | 362/517 |

* cited by examiner

Primary Examiner—Haissa Philogene
(74) Attorney, Agent, or Firm—Albert O. Cota

(57) ABSTRACT

A vehicle head light or auxiliary light assembly (10) that includes an inner housing (12) and an outer housing (30), wherein located between the inner and outer housings (12, 30) is a light passage channel (46). At the center of the inner housing (12) is attached a central light bulb (28), and to each side of the outer housing (30) is attached a side light bulb (52). To the front of the outer housing (30) is attached a front lens (56) having around its perimeter (60) a plurality of light refracting serrations (62). When the lights of the assembly (10) are turned on by an electrical control circuit (70), the central light (28) illuminates in combination with the side lights (52). The side lights produce a light beam that is applied through the light passage channel (46), is refracted along the serrations (62) and is visible along the inner perimeter (60) of the front lens (56). The electrical control circuit (70) can also be designed to allow the central light bulb (28) to be operated independently from the side lights (52).

17 Claims, 3 Drawing Sheets

VEHICLE HEAD LIGHT OR AUXILIARY LIGHT ASSEMBLY

TECHNICAL FIELD

The invention pertains to the general field of automotive light assemblies and more particularly to a vehicle head light or auxiliary light assembly that incorporates a central lamp in combination with a pair of lamps that produce a perimeter light.

BACKGROUND ART

Throughout the world, the most widely used means of personnel transportation is the automobile. As the automobile has evolved a substantial amount of interest has developed in personalizing or customizing automobiles. Some people are not content with the way their vehicle appears or performs upon leaving the factory. As a result, the number and selection of OEM and after-market products for vehicles has rapidly grown.

One of the most popular ways to customize an automobile is to alter the lights. A typical automobile has headlights in front, tail-lights at the rear, turn signal indicators, and can include auxiliary lights. A novel approach to increasing the visibility and adding aesthetics to the headlights and auxiliary lights is to add a perimeter light to the light assembly housing.

A search of the prior art patents and industry literature did not disclose any light assemblies that read on the claims of the instant invention.

DISCLOSURE OF THE INVENTION

The vehicle head light or auxiliary light assembly allows a vehicle head light or an auxiliary light to have a perimeter, color-selectable light that can function independently or in combination with the head light's or auxiliary light's conventional central light bulb. In its basic design configuration the assembly consists of:

a) an inner housing having an open front edge, b) a central light bulb attached to the inner housing, c) an outer housing having an open front edge, a central light bulb service opening, a right-side light bulb retaining structure located adjacent to the service opening, and a left-side light bulb retaining structure located adjacent to and on the opposite side of the service opening, d) a light passage channel located between the inner housing and the outer housing, e) a right-side light bulb and a left-side light bulb, with each inserted respectively into the left-side and the right-side light bulb retaining structure, f) a front lens attached around the open front edge of the outer housing, wherein the front lens has a perimeter having a continuous series of light refracting serrations. When the right-side and left-side lights produce a light beam, the beam is applied through the light passage channel onto the light refracting serrations, wherefrom a reflected light beam is produced that traverses along the light refracting serrations, and g) an electrical control circuit that is connected to and allows the central light bulb and the two side light bulbs to be operated. The circuit can be designed to allow the central light and the two side lights to be operated independently of each other or to be operated simultaneously.

In view of the above disclosure, the primary object of the invention is to produce a vehicle head light or auxiliary light assembly that in addition to having a conventional central light also includes a pair of side lights. The side lights produce a light beam that is directed through a light passage channel to the outer perimeter of the assembly, from where the light beam traverses along a series of light refracting serrations.

In addition to the primary object of the invention it is also an object of the invention to produce an invention that:

Adds to the aesthetics as well as providing an additional margin of safety.

Allows the color of the side lights to be selectable by the end user.

Is cost effective from both a consumer's and a manufacturer's point of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
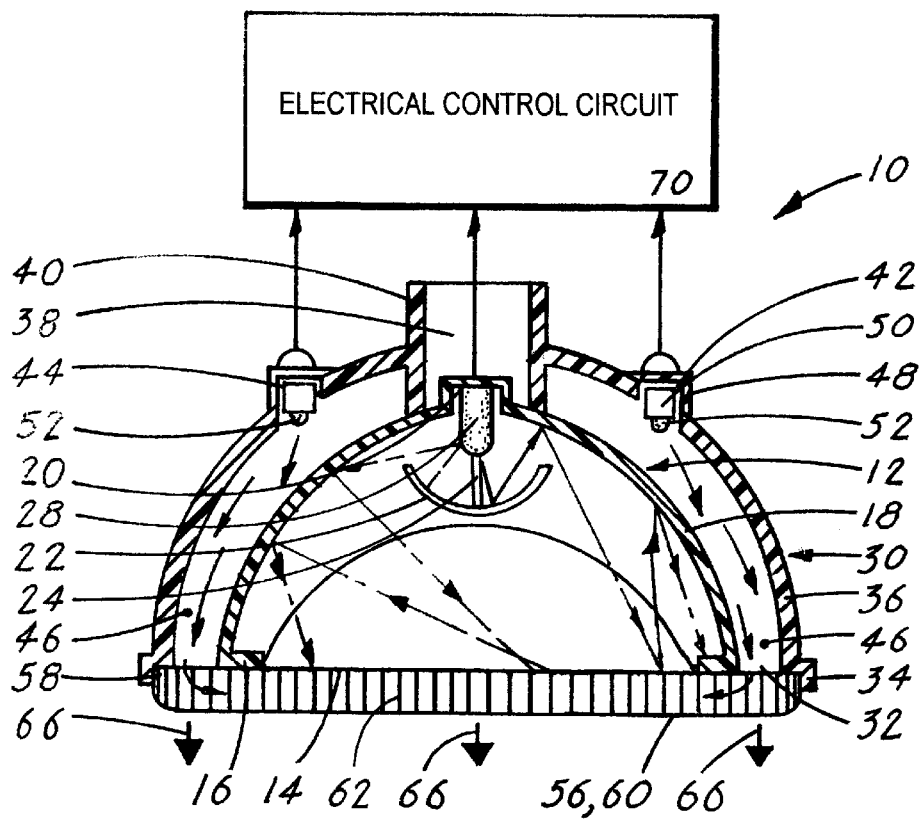
FIG. 1 is a top sectional view of a vehicle head light or auxiliary light assembly that includes a central light bulb and two side light bulbs that produce a perimeter light. The light bulbs as shown are connected to an electrical control circuit that operates the lights.

The best mode for carrying out the invention is presented in terms of a preferred embodiment for a vehicle head light or auxiliary light assembly that includes a central light and two side lights, which produce a perimeter light. The preferred embodiment of the vehicle head light or auxiliary light assembly 10, as shown in FIGS. 1–7, is comprised of the following major elements: an inner housing 12, an outer housing 30, a light passage channel 46, a front lens 56 and an electrical control circuit 70. The inventive elements function in combination with a central light bulb 28, a right-side light bulb 52, a left-side light bulb 52, and a vehicle 12-volt d-c power source 78.

The inner housing 12, as shown in FIG. 1, is preferably molded of plastic and has an open front edge 14 that terminates with an inward-facing perimeter tab 16. From the perimeter tab 16 extends inward a concave section 18 having a substantially centered light attachment opening 20. Attached by an attachment means 24 to the light attachment opening 20 is a light attachment structure 22 that is designed to accept the central light bulb 28. The concave section 18 on the inner housing 12 is further comprised of a plurality of chrome plated, vertically-stacked reflective sections 26 with each section having a plurality of light dispersing facets 27.

Figure 2:
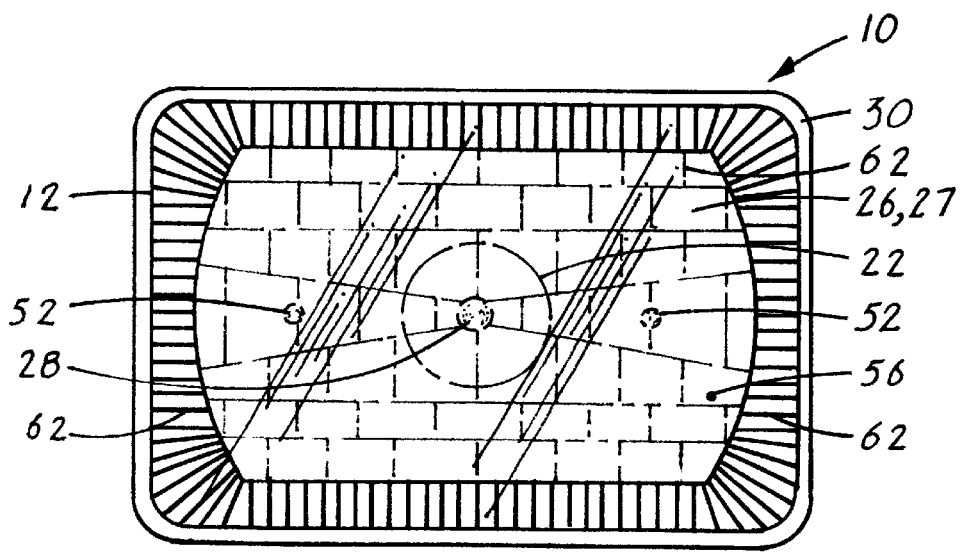
FIG. 2 is a front elevational view of a rectangular light assembly.
Figure 3:
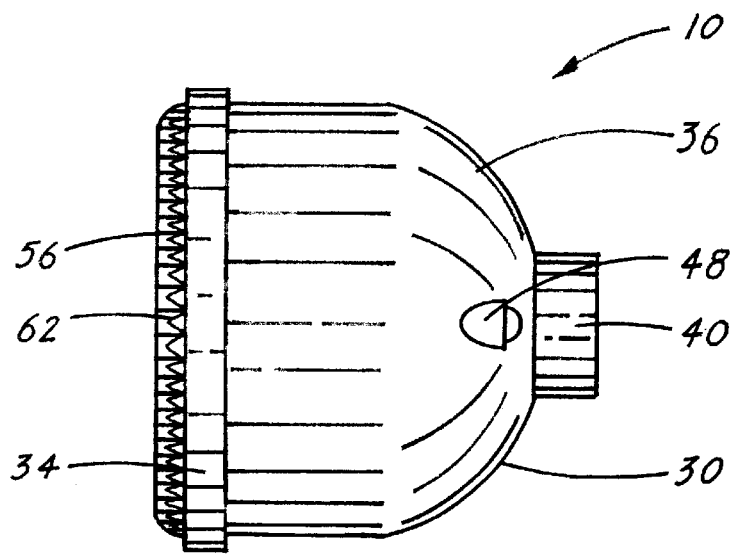
FIG. 3 is a side elevational view of the light assembly shown in FIG. 2.

The outer housing 30, as shown in FIGS. 1, 2 and 3, is also preferably molded of plastic and has an open front edge 32 that terminates with a perimeter ledge 34, as shown in FIG. 1. From the perimeter ledge extends inward a concave section 36 that has a substantially centered light bulb service opening 38. Around the service opening 38 is integrally molded a circular sleeve 40 which has a downward-extending terminus that interfaces with the surface of the inner housing 12, as shown in FIG. 1.

Figure 6:
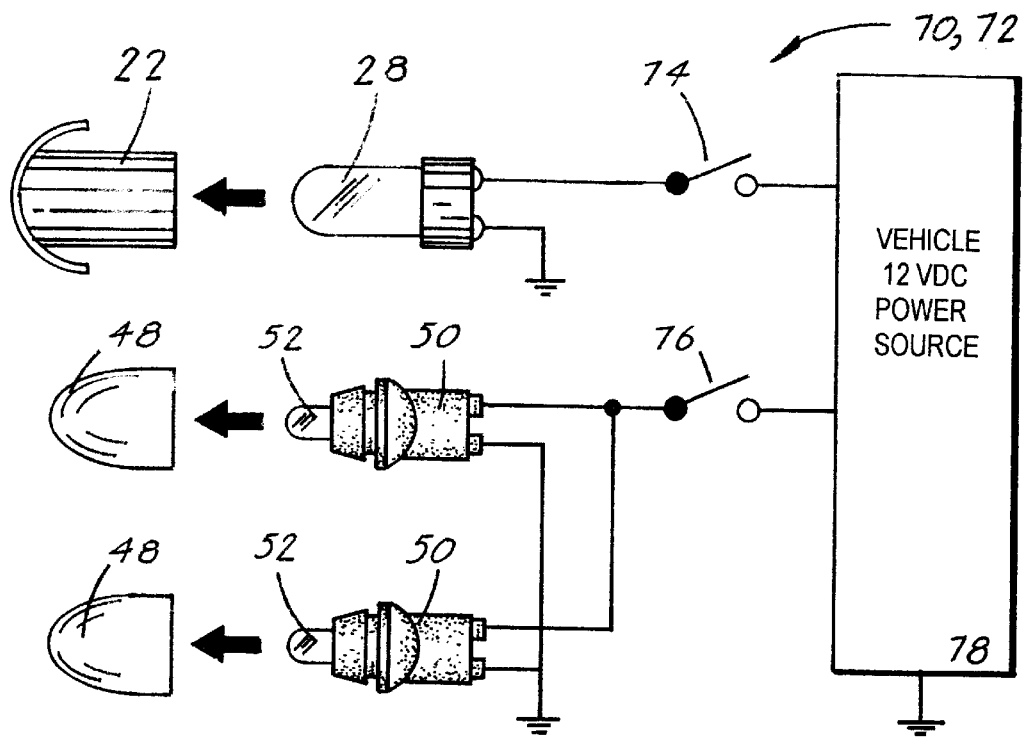
FIG. 6 is a schematic/block diagram of an electrical control circuit that allows the central light bulb and the two side light bulbs to be operated independently of each other.
Figure 7:
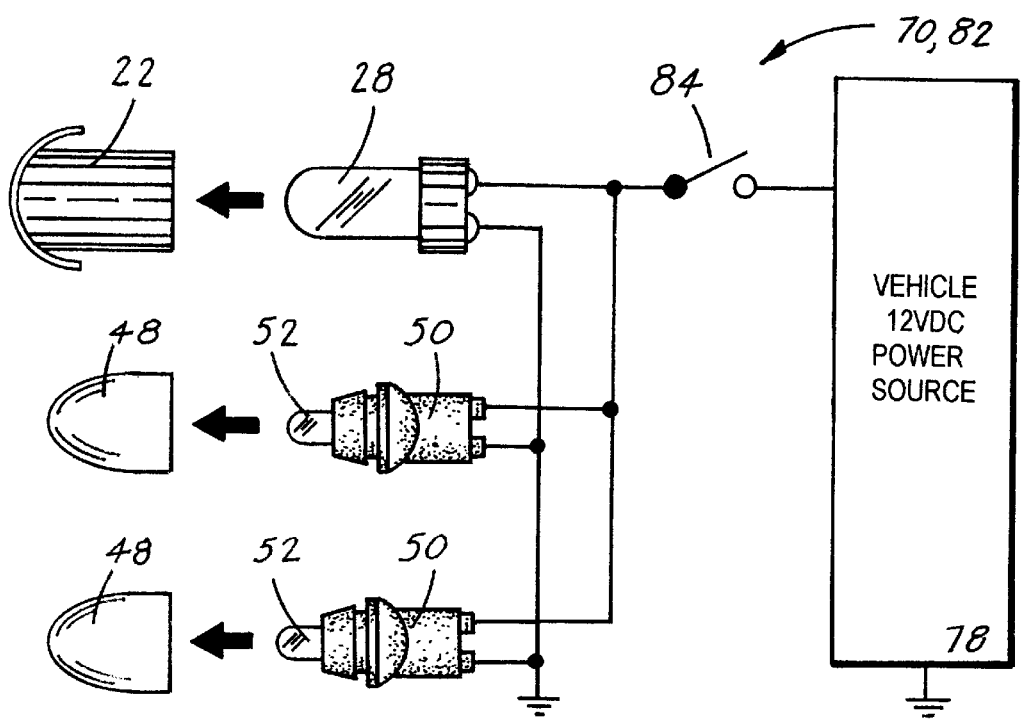
FIG. 7 is a schematic/block diagram of an electrical circuit that allows the central light bulb and the two side light bulbs to be operated simultaneously.

Adjacent the circular sleeve 40, as also shown in FIG. 1, is a right-side light bulb bore 42, and adjacent to and on the opposite side of the circular sleeve 40 is a left-side bulb bore 42 that is in alignment with the right-side light bulb bore 42. Extending outward from each of the side light bulb bores 42,44 is a light sleeve 48 that is designed and dimensioned to frictionally retain a right-side and a left-side light bulb retaining structure 50, which is dimensioned to frictionally retain a right-side and a left-side light bulb 52 respectively. A typical light bulb retaining structure 50, as shown in FIGS. 6 and 7, is molded of a resilient material, such as a rubber compound, which allows the structure 50 to be easily inserted and frictionally retained within the sleeve 40. As shown in FIG. 1, when the inner and outer housings 12,30 are assembled, the light passage channel 46 is located between the two housings.

The front lens 56, as shown in FIGS. 1–3, is attached by an attachment means 58 to the perimeter ledge 34, as shown in FIG. 1. As shown best in FIG. 2, the front lens 56 has an inner perimeter having a continuous series of light refracting serrations 62. When the right-side and left-side bulbs 52 produce a light beam 66, the beam 66 is applied through the light passage channel 46 onto the light-refracting serrations 62. The serrations 62 produce a reflected light beam that traverses the light refracting serrations 62. As shown in FIG. 3, the continuous series of the light-refracting serrations 62 are located on the inner surface of the front lens 56. When the serrations are viewed from the sides of the front lens 56 they form a continuous saw-tooth pattern, wherein each saw-tooth has side angles that range between 40 and 50 degrees, with an angle of 45 degrees preferred.

Figure 5:
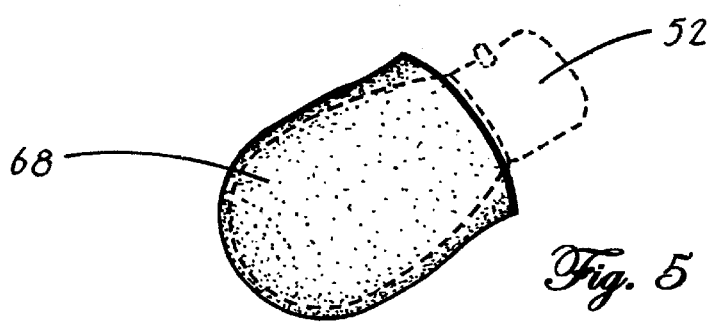
FIG. 5 is a perspective view showing a resilient colored enclosure inserted over a side light bulb.

The color of the light beam 66 produced by the two side light bulbs 52 can be determined by inserting bulbs of various colors. In lieu of using colored bulbs, a clear bulb can be used in combination with a resilient, colored enclosure 68, as shown in FIG. 5. The enclosure 68, which is dimensioned to be placed over at least one of the side light bulbs 52, allows the color that is emitted from the bulbs 52 to be determined.

The final element described is the electrical control circuit 70, which is disclosed in two designs.

The first design of the electrical control circuit 72, as shown in FIG. 6, is comprised of a first light power switch 74 and a second light power switch 74. The first switch 76 is connected in series between the 12-volt d-c power source 78 and the central light bulb 28. The second switch 76 is connected in series between the 12-volt d-c power source 78 and the two side light bulbs 52 that are connected in parallel. The first electrical control circuit allows the central light bulb 28 to be operated independently from the right and left light bulbs 52.

The second design of the electrical control circuit 72, as shown in FIG. 7, is comprised of a light power switch 84 that is connected in series between the 12-volt d-c power source 78 and the central light bulb 28, which is connected in parallel with the two side light bulbs 52. The second electrical control circuit allows all three light bulbs 28, 52 to be operated simultaneously.

Figure 4:
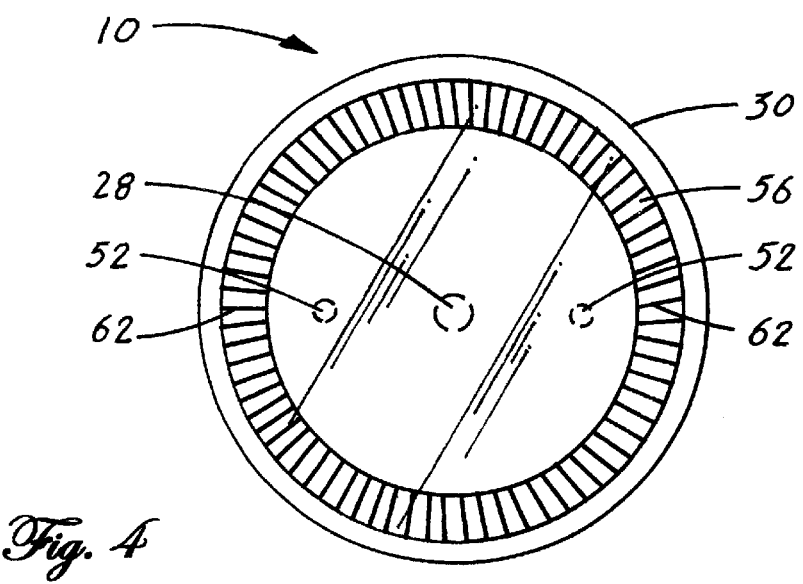
FIG. 4 is a front elevational view of a circular light assembly.

While the invention has been described in complete detail and pictorially shown in the accompanying drawings it is not to be limited to such details, since many changes and modifications may be made to the invention without departing from the spirit and the scope thereof. For example, the light assembly 10 when viewed from the front, as shown in FIG. 2, can have a substantially rectangular shape. Likewise, as shown in FIG. 4, the assembly 10 can be designed to have a substantially circular shape. Hence, it is described to cover any and all modifications and forms which may come within the language and scope of the claims.

What is claimed is:

1. A vehicle head light or auxiliary light assembly comprising:
   a) an inner housing having an open front edge,
   b) a central light bulb attached to said inner housing,
   c) an outer housing having an open front edge, a central light bulb service opening, a right-side light bulb retaining structure located adjacent to the service opening, and a left-side light bulb retaining structure located adjacent to and on the opposite side of the service opening,
   d) a light passage channel located between said inner housing and said outer housing,
   e) a right-side light bulb and a left-side light bulb, wherein each bulb is inserted respectively into the left-side and the right-side light bulb retaining structure,
   f) a front lens attached around the open front edge of said outer housing, wherein said front lens has a perimeter having a continuous series of light refracting serrations, wherein when the right-side and left-side lights produce a light beam, the beam is applied through the light passage channel onto the light refracting serrations, wherefrom a reflected light beam is produced that traverses the light refracting serrations, and
   g) an electrical control circuit having means for controlling the operation of the central light bulb and the two side light bulbs.

2. The light assembly as specified in claim 1 wherein the left-side and right-side bulb retaining structures are each comprised of a bulb bore surrounded by a sleeve that is dimensioned to receive and retain the respective said right-side and left-side light bulbs.

3. The light assembly as specified in claim 2 wherein said two side bulbs are each inserted into a respective light bulb retaining structure, wherein the retaining structure has having a resilient outer surface that is dimensioned to be frictionally inserted into the respective right and left sleeves.

4. The light assembly as specified in claim 1 wherein said electrical control circuit is further consists of a first electrical control circuit comprising:
   a) a first light power switch connected in series between a vehicle 12-volt d-c power source and the central light bulb, and
   b) a second light power switch connected in series between the vehicle 12-volt d-c power source and a pair of side light bulbs connected in parallel, wherein said first electrical control circuit allows the central light bulb to be operated independently from the right and left side light bulbs.

5. The light assembly as specified in claim 1 wherein said electrical control circuit is further consists of a second electrical control circuit comprising a light power switch connected in series between the 12-volt d-c power source and the central light bulb, which is connected in parallel with the right-side light bulb and said left-side light bulb, wherein said second electrical control circuit allows all three said light bulbs to be operated simultaneously.

6. The light assembly as specified in claim 5 wherein said light power switch is comprised of a vehicle light switch.

7. A vehicle head light or auxiliary light assembly comprising:
   a) an inner housing having:
      (1) an open front edge having an inward perimeter tab from where extends inward a concave section having a substantially-centered light attachment opening,
      (2) a central light attachment structure attached by an attachment means to the light attachment opening, and
      (3) a central light bulb attached to the central light attachment structure,
   b) an outer housing having:
      (1) an open front edge having a perimeter ledge from where extends inward a concave section having a substantially-centered light bulb service opening,
      (2) a circular sleeve positioned around the centered light bulb service opening,
      (3) a right-side light bulb bore located adjacent the circular sleeve,
      (4) a left-side light bulb bore located adjacent to and on the opposite side of the circular sleeve, wherein the left side bore is in alignment with the right-side light bulb bore, wherein located between said inner housing and said outer housing is a light passage channel,
      (5) a light sleeve extending outward from each of the side light bulb bores,
   c) a right-side light bulb and a left-side light bulb retaining structure, wherein each said retainer structure is dimensioned to frictionally retain a right-side and a left-side light bulb respectively and to be frictionally held within each respective light sleeve,
   d) a light passage channel located between said inner housing and said outer housing,
   e) a front lens attached by an attachment means to the perimeter ledge on said outer housing, wherein said front lens has an inner perimeter having a continuous series of light-refracting serrations, wherein when the right-side and left-side light bulbs produce a light beam, the beam is applied through the light passage channel onto the light-refracting serrations wherefrom a reflected light beam is produced that traverses the light refracting serrations, and
   f) an electrical control circuit having means for controlling the operation of the central light bulb and the two side light bulbs.

8. The light assembly as specified in claim 7 wherein the concave section of the inner housing is further comprised of a plurality of vertically-stacked reflective sections, with each section having a plurality of light dispersing facets.

9. The light assembly as specified in claim 8 wherein the vertically stacked sections are chrome plated.

10. The light assembly as specified in claim 7 wherein said right-side and said left-side light bulb retaining structures are molded of a resilient material that allows said structures be frictionally inserted into the respective right and left sleeves.

11. The light assembly as specified in claim 7 further comprising a resilient, colored enclosure that is dimensioned to be placed over at least one of said side light bulbs, wherein said enclosure allows the color that is emitted from said right-side and said left-side light bulbs to be selectable.

12. The light assembly as specified in claim 7 wherein said electrical control circuit is further consists of a first electrical control circuit comprising:
   a) a first light power switch connected in series between a vehicle 12-volt d-c power source and the central light bulb, and
   b) a second light power switch connected in series between the vehicle 12-volt d-c power source and a pair of side light bulbs connected in parallel, wherein said first electrical control circuit allows the central light bulb to be operated independently from the right and left side light bulbs.

13. The light assembly as specified in claim 7 wherein said electrical control circuit is further consists of a second electrical control circuit comprising a light power switch connected in series between the 12-volt d-c power source and the central light bulb which is connected in parallel with the right-side light bulb and said left-side light bulb, wherein said second electrical control circuit allows all three said light bulbs to be operated simultaneously.

14. The light assembly as specified in claim 7 wherein when said light assembly, is viewed from the front, it has a substantially rectangular shape.

15. The light assembly as specified in claim 7 wherein when said light assembly, is viewed from the front, it has a substantially circular shape.

16. The light assembly as specified in claim 7 wherein said front lens has a smooth outer surface and the continuous series of light-refracting serrations are located on the inner surface of said front lens.

17. The light assembly as specified in claim 16 wherein when the light-refracting serrations are viewed from the sides of said front lens, the serrations form a continuous saw-tooth pattern, wherein each saw-tooth has side angles that range between 40 and 50-degrees, with an angle of 45-degrees preferred.

* * * * *